Sept. 30, 1969     H. W. MATHLEY ET AL     3,469,723
MOBILE HOME SYSTEM
Filed Oct. 5, 1967     2 Sheets-Sheet 1
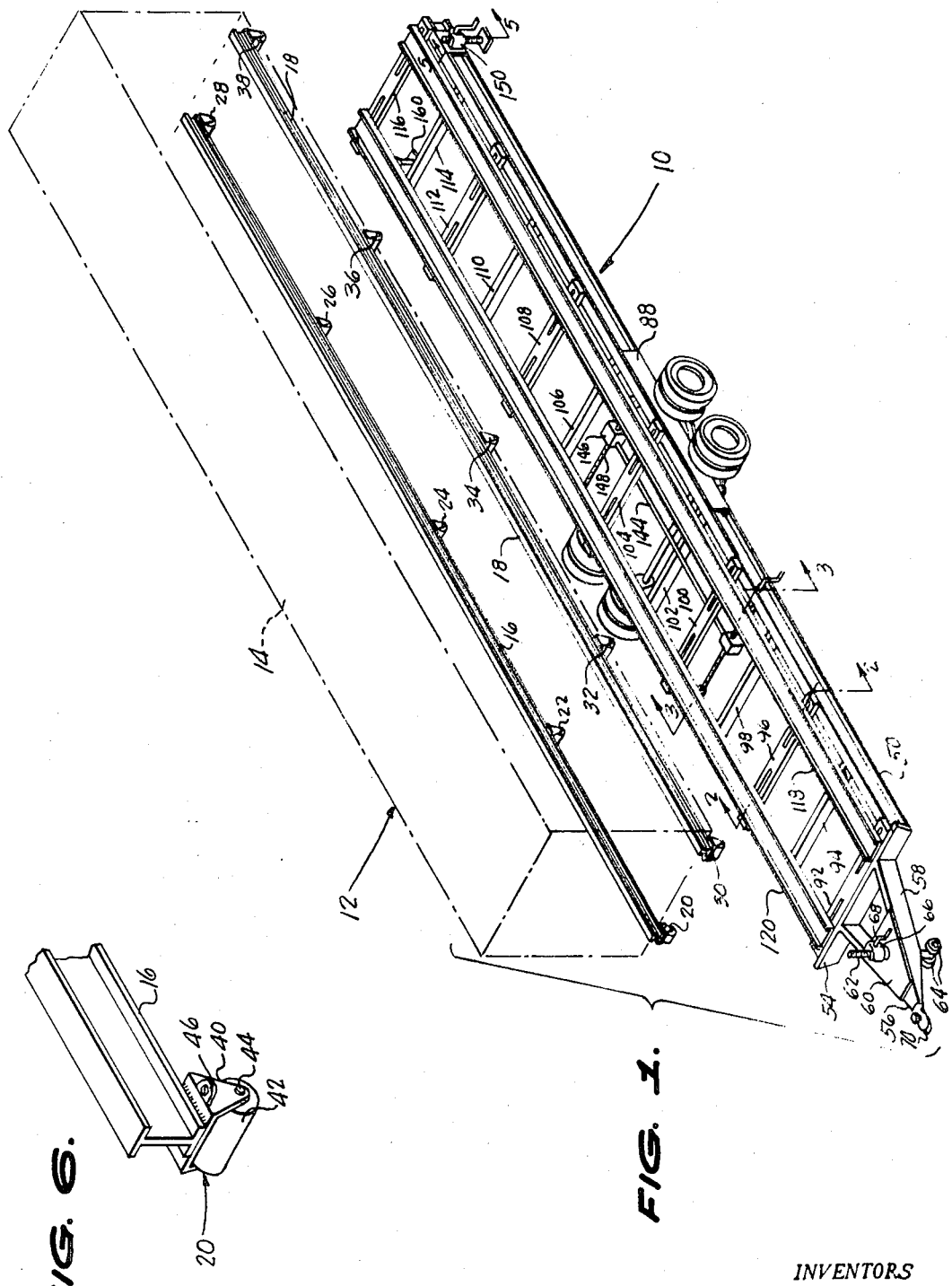
INVENTORS
HARRY W. MATHLEY,
JOHN L. DWINELL,
BY Kimmel, Crowell & Weaver
ATTORNEYS.

Sept. 30, 1969     H. W. MATHLEY ET AL     3,469,723
MOBILE HOME SYSTEM
Filed Oct. 5, 1967     2 Sheets-Sheet 2
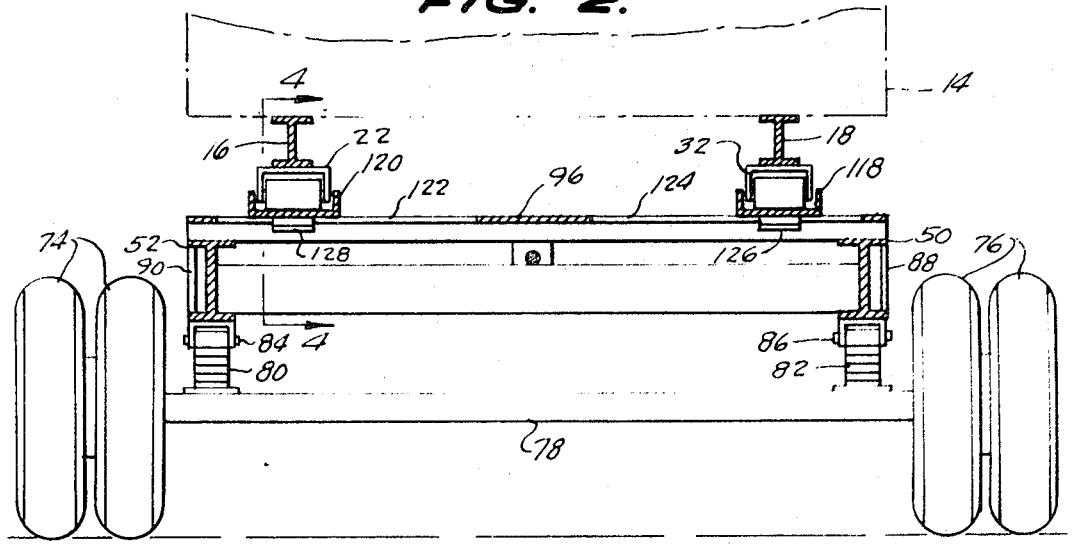
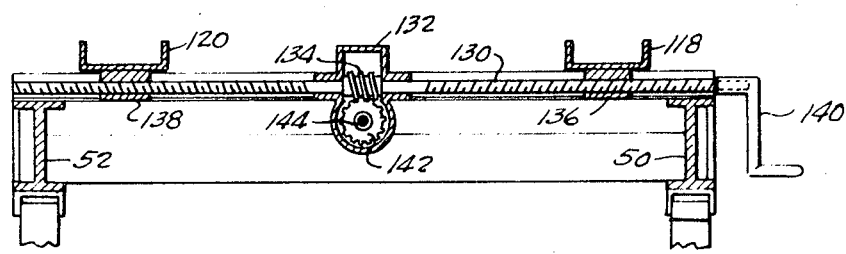
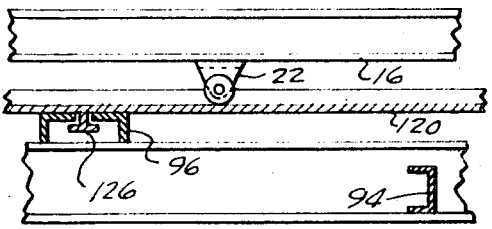
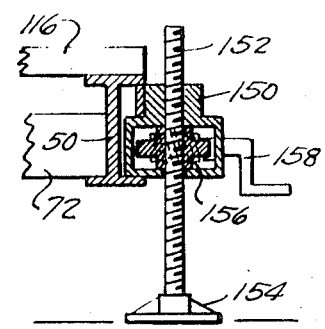
INVENTORS.
HARRY W. MATHLEY,
JOHN L. DWINELL,
BY Kimmel, Crowell & Weaver
ATTORNEYS.

United States Patent Office 3,469,723
Patented Sept. 30, 1969

3,469,723
MOBILE HOME SYSTEM
Harry W. Mathley and John L. Dwinell, Louisville, Ky., assignors, by direct and mesne assignments, of fifty-one percent to said Mathley, nineteen percent to said Dwinell, and ten percent each to Robert J. Berman, Bernard S. Berman, and Leon J. Shaikun, all of Louisville, Ky.
Filed Oct. 5, 1967, Ser. No. 673,203
Int. Cl. B60p 1/64, 3/32; B62d 23/00
U.S. Cl. 214—516                                7 Claims

ABSTRACT OF THE DISCLOSURE

A mobile home having a housing unit for providing permanent quarters for human occupancy including a plurality of rollers on the bottom thereof arranged in parallel rows and received in parallel tracks on a running gear assembly including a frame for movably supporting the tracks, a wheel assembly for transporting the frame and a gear assembly for laterally adjusting the tracks in spaced relation about a center point simultaneously.

BACKGROUND OF THE INVENTION

Field of the invention

This invention relates to transportable homes commonly referred to as mobile homes and sometimes referred to as trailer houses, mobile offices, mobile motel units.

Description of the prior art

Mobile homes or trailer houses are known in the prior art. Such homes of this type as are known in the prior art are conventionally provided with integrally built running gear and towing facilities. This means that a substantial part of the cost and weight of a mobile home is the result of the necessity for providing means for transporting the home from one place to another. This is generally satisfactory for smaller homes which are intended to be moved frequently from one place to another and which are easily transportable by means of conventional vehicles. However, in recent years it has become common practice to construct "mobile" homes which are in fact intended for permanent occupancy and are not intended or constructed for frequent moving. It has become fairly common practice to construct such mobile homes at one point and transport them to another point for permanent fixation with the intent that they never be moved again or that such movement take place many years in the future. Furthermore, the practice has become prevalent of building homes which are so large and so heavy as to require specially constructed vehicles for transporting them. That is, the ordinary automobile lacks the power and constructional strength to pull such a "mobile" home from one point to another. In this sense, the homes are really not mobile within the meaning of the term as originally applied. Nevertheless, even in the latter case, it has become necessary to build into each of the mobile homes running gear strong enough to provide for initial transit from the point of manufacture to the point of use. Once the home has reached the point of use, the running gear which is integrally built therewith ceases to serve any function but it nevertheless is unusable for any other purpose.

It is also known in the prior art to provide small portable housing units, often referred to as "campers," for being transported from one place to another by a pickup or small truck. In this instance, the camper is merely loaded onto the truck or pickup and is hauled from one place to another as would be any other cargo.

The present invention is distinguished from the devices and systems of the prior art in that it provides a permanent dwelling which is a mobile home and yet which does not require the permanent fixation of running gear as is commonly the practice. Accordingly, the principal object of the invention is to provide an improved mobile home system which includes a mobile home unit and a running gear assembly, by eliminating the running gear assembly from the mobile home and having that assembly as a separate facility.

SUMMARY

The present invention comprises a running gear assembly which includes a frame and wheels connected to the frame for movably supporting the frame during transportation over highways, roads, and geographic terrain in general, and includes a mobile home unit having a housing portion constructed and adapted for permanent occupancy by persons which is supported by a plurality of rows of rollers on the bottom by the running gear assembly frame such that the unit may selectively be removed from the frame for use in a fixed location and secured to the frame for transportation to another location and, similarly, the frame may be used for the transportation of many units individually. Accordingly, it is an object of this invention to provide a mobile home system which has a separable running gear assembly.

A further object of this invention is to provide a mobile home assembly in which a mobile home unit is supported by means of rollers, on a running gear assembly.

An additional and important object of this invention is to provide a running gear assembly for a mobile home system which includes a pair of laterally movable spaced apart runners for supporting the mobile home unit.

Another object of the invention is the provision of a novel running gear assembly for supporting mobile home units.

Still another object of the invention is the provision of a novel mobile unit which is supported by a plurality of rollers arranged in rows.

The specific construction of the unit and of the running gear assembly constitutes important objects of the invention.

Further and important objects will also be apparent from the specification which follows and from the drawings to which reference is now made.

BRIEF DESCRIPTION OF THE DRAWING

FIGURE 1 is an isometric exploded view of the system of this invention showing the mobile home unit spaced above the running gear assembly.

FIGURE 2 is an enlarged fragmentary transverse cross-section taken along the line 2—2 of FIGURE 1 looking in the direction of the arrows.

FIGURE 3 is an enlarged fragmentary transverse cross-section taken on the line 3—3 of FIGURE 1 looking in the direction of the arrows.

FIGURE 4 is a fragmentary longitudinal cross-section taken on the line 4—4 of FIGURE 2 looking in the direction of the arrows.

FIGURE 5 is an enlarged fragmentary transverse cross-section on the line 5—5 of FIGURE 1 looking in the direction of the arrows.

FIGURE 6 is a fragmentary perspective view of a roller assembly secured to a support beam on the mobile home unit.

DESCRIPTION OF THE PREFERRED EMBODIMENT

As will be apparent from FIGURE 1, the present invention comprises two major components, a running gear assembly 10 and a mobile home unit 12. The mobile home unit 12 includes a housing 14 which may be of any design or shape or construction for permanently housing persons. It will be understood that there are many designs which are both esthetically attractive and arranged for great convenience in living. No particular shape or configuration of the housing is contemplated by this invention. The only requirement is that the housing be of the type which is constructed and adapted for human occupancy.

The housing 14 is supported by a pair of elongate parallel beams 16 and 18 which, as best illustrated in FIGURE 6, are preferably in the form of I-beams. Channel beams or any other type of beam of adequate strength and rigidity would, however, be satisfactory. Beams of the type presently used by current mobile home manufacturers, used to form a solid rigid base for the mobile unit, are conveniently used in this invention.

The beams 16 and 18 are, in turn, suported by respectively, roller assemblies 20, 22, 24, 26 and 28 on beam 16 and 30, 32, 34, 36 and 38 on beam 18. One of the roller assemblies is shown in greater detail in FIGURE 6. The roller assembly 20 is secured by welding, or any other conventional means, to the beam 16 and includes a yoke 40 and a roller 42 which is secured therein by a pin 44. Bearings may be provided as is conventionally the practice between the pin 44 and the roller 42. In addition, a tie-down eye 46 is secured to the yoke 40 for securing the trailer to the frame. The other roller assemblies would be identical in all respects except that the centrally disposed roller assemblies need not include the tie-down means 46.

The remaining gear assembly 10 includes a frame of which the major components are a pair of parallel I-beams 50 and 52, beam 52 being best shown in FIGURES 2 and 3. Of course, channel beams or the equivalent could be used.

The beams 50 and 52 are secured together at the front by a front plate or cross-member 54. Secured to the front cross-member 54, for pulling the running gear assembly by a tractor or other self-powered vehicle, are a pair of forwardly converging beams 56 and 58 secured together by means of a plate 60. Plate 60 supports a vertical threaded rod 62 which in turn carries at the bottom thereof a pair of wheels 64. A gear box 66 may be of any conventional type such as will permit vertical adjustment of the rod 62 by means of the crank 68. A gear box such as is shown in FIGURE 5 may be used. Conventionally, a pinion gear is threadably received on the upright shaft or rod 62 and a worm gear secured to the crank is used for rotating the pinion gear which, in turn, forces the gear box and consequently the plate 60 to move upwardly and downwardly with respect to the rod 62 to provide vertically adjustable support for the front end of the running gear assembly. Of course, any means for providing the vertical adjustment may be substituted according to the practice and skill of the prior art.

The running gear assembly is attached by means of a hitch 70 to the rear of a conventional tractor of the type which is constructed and adapted to pull trailers along the highway.

A rear plate 72, best shown in FIGURE 5, secures the other end of the beams 50, 52 together.

The beams 50, 52 are supported for transportation along highways, roads, and geographic terrain generally by means of a plurality of wheels 74 on one side and 76 on the other, secured together by means of an axle or axles 78. The axle 78 is supported by springs 80 and 82 and by spring yoke and pin assemblies 84 and 86, according to conventional practice. The yokes 84 and 86 are secured to the beams 50 and 52 by welding or by bolts according to the usual custom of the art. If desired, reinforcing plates or members 88 and 90 may be provided in the vicinity of the tires for strengthening the frame.

Additional lateral reinforcement and securement between the beams 50 and 52 is provided by a plurality of cross-members 94, 98, 102, 106, 110 and 114, in co-operation with the front plate 54 and the rear plate 72, provide strength and rigidity to the frame of the running gear assembly.

The cross-members 92, 96, 100, 104, 108, 112 and 116, are mounted on top of the beams 50, 52, and in addition to providing additional strength to the frame, support a pair of elongate channel members 118 and 120 thereon for relative transverse movement. As best illustrated in FIGURE 2, each of the last named cross-members is provided with a pair of slots as shown at 122 and 124 for the cross-member 96. Preferably, each of these cross-members is in the form of a channel member which is inverted and welded or bolted to the beams 50 and 52. Extending downwardly into each of the slots and welded or otherwise securely affixed to the channel members 118 and 120 are a pair of T-shaped retainers which permit lateral movement of the channel members 118 and 120 with respect to the cross-members and the beams 50 and 52 but prevent vertical removal thereof.

It is necessary, as a practical economic matter, to provide for relative lateral movement of the channel members since not all units necessarily have the same spacing for the rollers. For example, it would be highly desirable to provide more widely spaced rollers on very large mobile home units than on comparatively smaller mobile home units. It is thus a practical necessity or at least a highly desirable feature to provide for relative lateral movement of the cannel support members.

Moreover, it is important that the channel support members 118, 120 be laterally adjusted substantially equally apart from a central point on the frame so as not to provide for an asymmetric load on the running gear assembly 10. To this end, as best shown in FIGURE 3, the means are provided for laterally adjusting each of the runner channel members outwardly substantially equally from a center point therebetween. In the preferred embodiment, the means for accomplishing this desired result include an elongate shaft 130 which is oppositely threaded on the respective ends thereof and which extends through a gear box 132 and is provided with a worm gear 134 in the gear box. The threaded ends of the shaft 130 are threadably received in downward extensions 136 and 138 which are fixedly secured to the channel members 118 and 120, respectively. The shaft 130 is rotated by a crank or equivalent means 140. Motorized means could be provided, obviously, if desired. It will be apparent that since the shaft 130 is oppositely threaded, rotation of the crank 140 in one direction will cause the channel members to move equally outwardly while rotation in the other direction will cause them to move equally inwardly with respect to a central point, in this case the gear box 132, therebetween. Because the channel members 118, 120 are rather long, a single point of movement would tend to cause binding as the channel members 118, 120 moved inwardly or outwardly. In order to obviate this difficulty, it is desirable to provide at least two points of drive for moving the channel members 118, 120. Of course as many points of drive as are desired may be provided. In order to provide for auxiliary drive, then, a pinion gear 142 is secured for rotating a shaft 144 which, as shown in FIGURE 1, extends rearwardly to a gear box 146 which in turn rotates a shaft 148 which is threaded similarly with respect to the shaft 130. The gear box 146 may include gearing of any conventional type such as a ring gear on the shaft 148 driven by a beveled pinion gear on the shaft 144 as is conventional practice in the art. All that is required is that the shaft 148 be caused to rotate at the same speed as the shaft 130 so as to prevent binding as a result of asymmetric movement of the channel members 118 and 120. Lubrication points will, of course, be provided at all points of friction as is good practice according to the methods taught in the prior art.

As previously described, means are provided at the front of the running gear assembly 10 for supporting that end. It is also desirable to provide means at the rear for supporting the rear end of the running gear assembly. To this end, a gear box 150 is secured to the beam 50 and receives therethrough a vertically disposed threaded shaft 152 to which a foot 154 may be secured. The frame, and more particularly the beam 50, is selectively moved vertically with respect to the foot 154 by means of a pinion gear 156 threadably received on the shaft 152 and a worm gear secured on the crank 158, in a manner similar to the gear box 132. Thus, rotation of the crank 158 and, consequently of the worm gear thereon, causes the gear 156 to rotate and to move relative to the shaft 152. Similarly, means 160 for supporting the other rear corner of the running gear assembly may desirably be provided. The means 160 would, of course, preferably be of the same type just described.

It will be apparent from the foregoing that the mobile home unit may easily be loaded and unloaded and may easily be transported great distances at high speeds since the running gear assembly can economically be built much more rigidly and strongly than is economically practicable where the running gear, as currently being mounted on mobile home units, is intended for only one or two trips. This provides for greater economy and lower repair costs. Furthermore, once the mobile home unit is transported to the desired place, it may be supported by pillars or a foundation wall as desired, which support channel members or the equivalent thereon. A very substantial fraction of the cost of constructing mobile home units of this type is avoided by the construction of a single separable running gear assembly which may be used for the transportation of several mobile home units individually. Obviously, the greatest savings can be obtained where very large mobile home units are involved.

It will be understood, that certain elements have been omitted from the drawing and from specific description in the embodiment of the specification in order not to obscure the invention. For example, brakes, brake lights, signal lights of all types, electrical systems and braking systems generally, and other equipment as is conventionally provided, for example, plumbing, etc., will be included but since they are known in the prior art and constitute no essential part of this invention, they have not been described with particularity. Further, it will be understood that certain reversal of parts may be made without departing from the invention. For example, while the rollers are shown secured to the mobile home unit and the receiving channel is secured to the running gear, a fully equivalent construction would include rollers secured to the running gear and a receiving channel secured to the mobile home unit. Accordingly, while the claims are drafted with reference to the particular embodiment, it is intended that the reversal of these components be included within the scope of the claimed invention as being the full and complete equivalent thereof. Other reversals of parts may be made and alterations from the exact description without departing from the spirit and scope of the invention as well.

It will be apparent that a result can be accomplished by means of the present invention which cannot be accomplished by the devices of the prior art. The economic, technical and practical utilitarian advantages of the present invention will be apparent from the drawings and the specification just preceding. It will be understood, however, that the specification and drawings are merely exemplary of a preferred embodiment of the invention and are not intended in the limiting sense.

We claim:

1. A mobile home system comprising:
   a running gear assembly including a frame and wheels connected to the frame for movably supporting the frame for transportation over highways and the like;
   a mobile home unit including a housing constructed and adapted for permanent occupancy by persons and means on the bottom of the housing for selectively movably supporting the unit on the running gear assembly frame;
   whereby the unit may selectively be removed from the frame for use in a fixed location and secured on the frame for transportation to another location;
   said frame comprising a pair of spaced runner channel members for supporting the unit;
   said unit including a plurality of rollers secured to the bottom of the housing in spaced rows corresponding to the spacing of the runner channel members for being received therein, said rollers comprising the means for supporting the housing on the frame;
   means for laterally adjusting the spacing between the runner channel members of the frame including;
   means for laterally adjusting each of the runner channel members outwardly substantially equally from a center point therebetween comprising;
   a plurality of elongate screw members spaced longitudinally along the runner members;
   means on each of the runner members threadably receiving the screw members;
   a longitudinally extending elongate shaft;
   gear means on the shaft drivingly interconnecting the screw means and the elongate shaft; and
   means for driving a screw member for simultaneously adjusting the spacing of the runner members with respect to a center point therebetween.
2. The system of claim 1 further compirsing:
   means movably secured to the frame proximate an end thereof for supporting the end above the earth.
3. The system of claim 1 further comprising:
   means for securing the unit the frame.
4. The system of claim 1 further comprising:
   a plurality of laterally extending support beams, said beams having a slot therein;
   a retainer secured to the runner members extending through the slots for preventing removal of the runner members from the frame and for laterally guiding the runners on the frame during adjustment.
5. The system of claim 4 further comprising:
   means for securing the unit to the frame.
6. The system of claim 4 further comprising:
   means movably secured to the frame proximate an end thereof for supporting the end above the earth.
7. The system of claim 6 further comprising:
   means for securing the unit to the frame.

References Cited

UNITED STATES PATENTS

| | | | |
|---|---|---|---|
| 1,799,233 | 4/1931 | Holan | 296—35 XR |
| 2,924,829 | 2/1960 | Mosier. | |
| 3,027,580 | 4/1962 | Haack | 214—85 XR |

ALBERT J. MAKAY, Primary Examiner

U.S. Cl. X.R.

105—366; 296—35